Feb. 15, 1949.  A. T. SCHEIWER  2,461,700
SEALED COUPLING

Filed July 17, 1946  3 Sheets-Sheet 1

INVENTOR.
Albert T. Scheiwer

INVENTOR.
Albert T. Scheiwer

Patented Feb. 15, 1949

2,461,700

UNITED STATES PATENT OFFICE 2,461,700

SEALED COUPLING

Albert T. Scheiwer, Erie, Pa.

Application July 17, 1946, Serial No. 684,359

7 Claims. (Cl. 284—19)

This invention relates generally to couplings and more particularly to ball-type couplings.

Conventional ball-type couplings with check valves have had the check valves disposed internally of the male or the female member, leaving a considerable portion of the male and female member open after the coupling members were disconnected to permit a loss of fluid. Dirt would also enter the coupling members and cause leakage of the check valves.

It is, accordingly, an object of my invention to overcome the above and other defects in ball-type coupling members, and it is more particularly an object of my invention to provide a sealed ball-type coupling member which is simple in construction, economical in cost, simple in operation, and efficient in operation.

Another object of my invention is to provide a coupling member which is closed to the entrance of dirt, dust and the like.

Another object of my invention is to provide a check valve for a coupling member which permits no loss of fluid upon disconnection of the coupling member.

Another object of my invention is to provide protective means for the check valves of a coupling member which prevent escape of fluid and to bar the entrance of dust, dirt and the like.

Other objects of my invention will become evident from the following detailed description, taken in conjunction with the accompanying drawings, in which.

Figure 1:
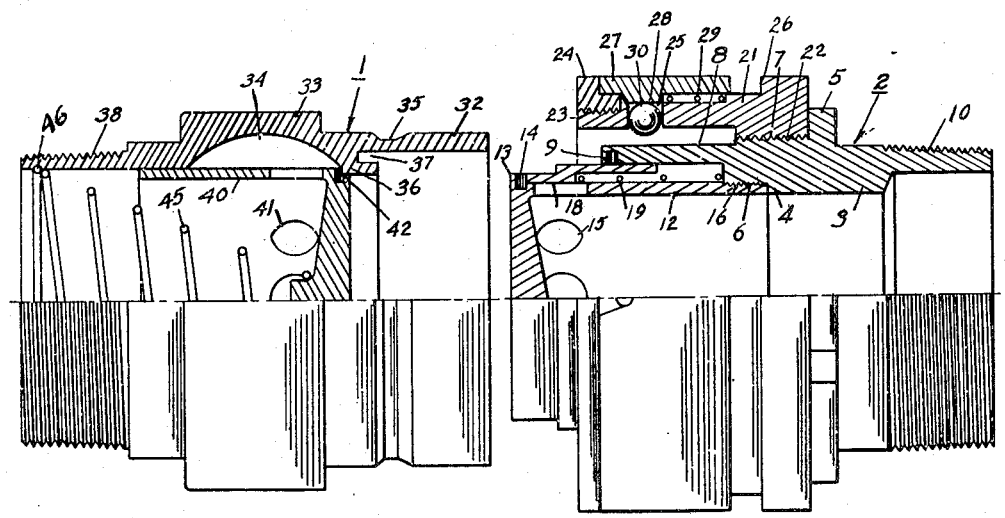
Fig. 1 is a side elevational view with the upper parts broken away of my novel invention in a separated position.
Figure 2:
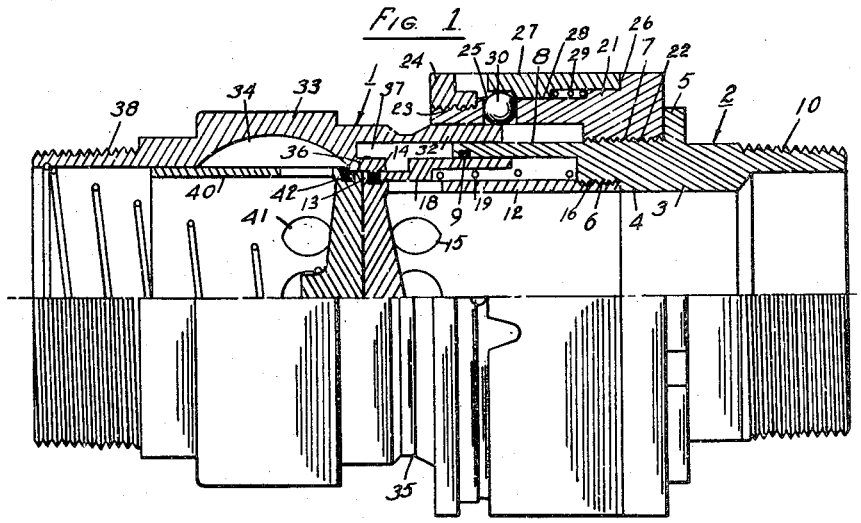
Fig. 2 is a side elevational view with the upper part thereof broken away of my novel coupling member in a sealed open position.
Figure 3:
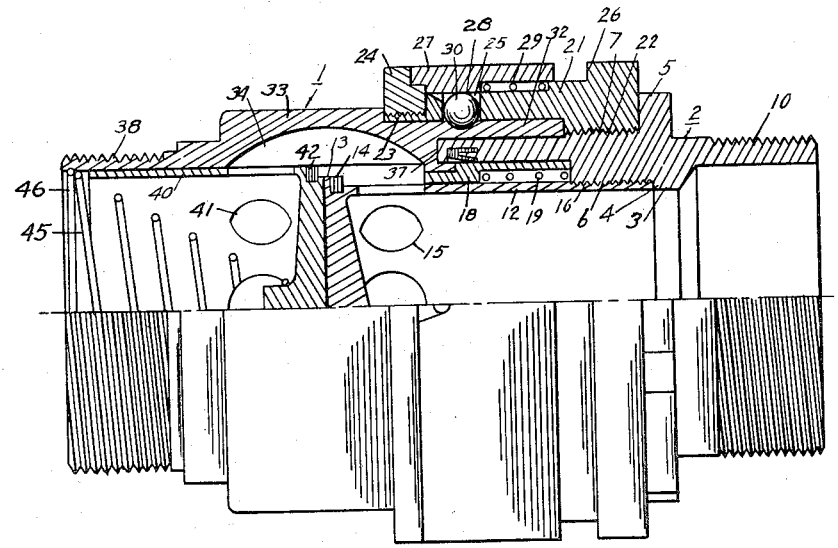
Fig. 3 is a side elevational view with the upper part thereof broken away of my novel coupling member in a closed position with the check valves in an open position wherein fluid is free to pass through the coupling member.

Referring now to the drawings, Figs. 1, 2, and 3 show a male member 1 and a female member 2. The female member 2 comprises a sleeve 3 having an inner shoulder 4, an outer shoulder 5, an inner threaded portion 6, and outer threaded portion 7, a longitudinally extending sleeve 8 with washer 9 disposed on the inner side thereof and a threaded portion 10 for connection to a pipe line. A cup shaped, cylindrical member 12 has an upwardly extending lip portion 13, a washer 14, laterally extending apertures 15, and a threaded portion 16 for threadable engagement with the threaded portion 6 of the sleeve 3. An offset sleeve 18 is telescopically disposed on the cup-shaped member 12 and is urged against the washer 14 by spring member 19. An outer cylindrical member 21 has a threaded portion 22 for engagement with the threaded portion 7 of the sleeve 3. Member 21 also has a threaded portion 23 for receiving an abutting member 24 in threaded engagement and it also has laterally extending ball retaining apertures 25 for receiving ball members 30. Member 21 also has a shoulder 26 for limiting the movement of locking sleeve 27, which has a depending camming portion 28 and is urged against the abutting member 24 by spring member 29.

The male member 1 comprises a connecting portion 32, and enlarged portion 33 to provide an inner arcuate shaped groove 34, a peripheral groove 35 for receiving ball members 30, an inner shoulder 36 formed to provide an inner longitudinally extending groove 37, and a threaded portion 38 for threadable engagement with a pipe line. A check valve in the male member 1 comprises a cup-shaped cylindrical member 40 having laterally disposed apertures 41 and an annular washer 42 for sealing relationship with the shoulder 36 by means of a spiral spring member 45 held in position by spring clip 46.

Normally, the male and female members 1 and 2 will take an open position as shown in Fig. 2 and dirt and other deleterious matter is barred from entrance into the interior of the coupling member. Fig. 3 shows the coupling in normally closed position with no part of the interior of the coupling exposed to the atmosphere. To open the coupling members 1 and 2 to the flow of fluid, the fixed cylindrical cup member 12 of coupling member 2 is moved longitudinally against the cup member 40 disposed in member 1 to a position shown in Fig. 3. The fluid will then flow through the apertures 15 around the arcuate groove 44 through the apertures 41 and out through male coupling member 1, or vice versa. Upon longitudinal movement of the member 2, the outwardly extending sleeve 8 will nest in the horizontally extending groove 37 of the male member 1, and the off-set sleeve 18 will abut against the shoulder 36 of the male member 1 to uncover the apertures 15 of the cylindrical cup member 12. The connecting portion 32 of the male member 1 enters a cylindrical groove formed by the extending sleeve portion 8 and the outer member 21 and the groove 35 on connecting portion 32 of the male member 1 is engaged by ball members 30 and locked in position by camming portion 28 of the locking sleeve 27. Coupling members 1 and 2 are closed by moving the locking sleeve 27 to free the ball members 30, in the groove 35 on the male member 1, thereby permitting longitudinal movement of the male member 1. The spring 45 in the male member 1 will force the washer 42 in the cup member 40 against the shoulder 36 to seal the male member 1. The sleeve 18 will be forced over the apertures 15 in the cylindrical member 12 by spring member 19 as the cylindrical member 12 moves out of the male member 1. It will be noted from Fig. 2 that even though the cup members 12 and 40 are in sealing relationship and both lines closed, there is no loss of fluid, because the cylindrical member 40 and the cylindrical member 12 abut each other and sleeve 18 and outwardly extending portion 8 of the sleeve 3 entirely close the apertures 15 in the cylindrical member 12.

Figure 4:
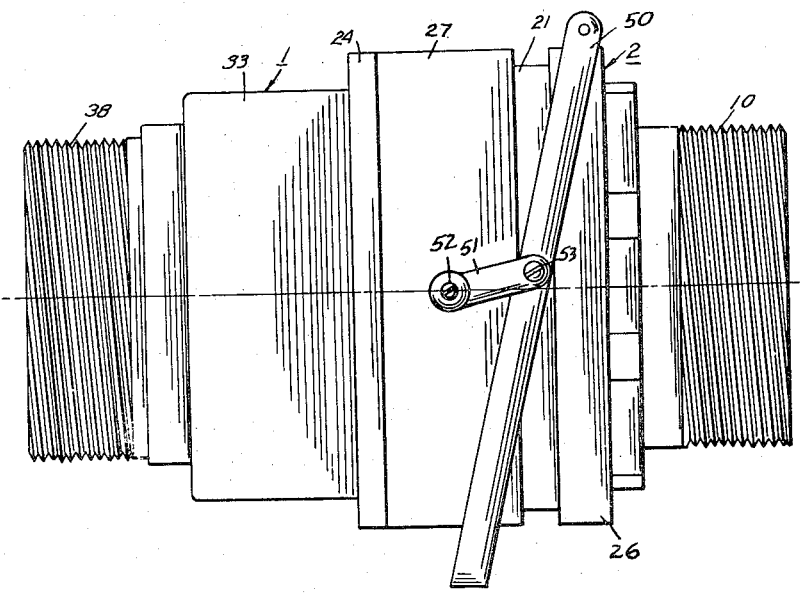
Fig. 4 is a side elevational view of my novel coupling member with an opening lever disposed thereon.
Figure 5:
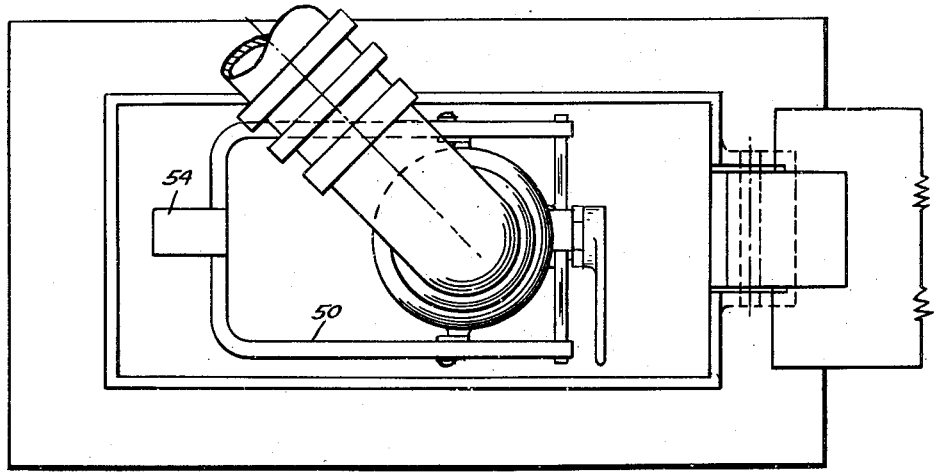
Fig. 5 is a top plan view of my novel coupling member with an opening lever attached thereto.
Figure 6:
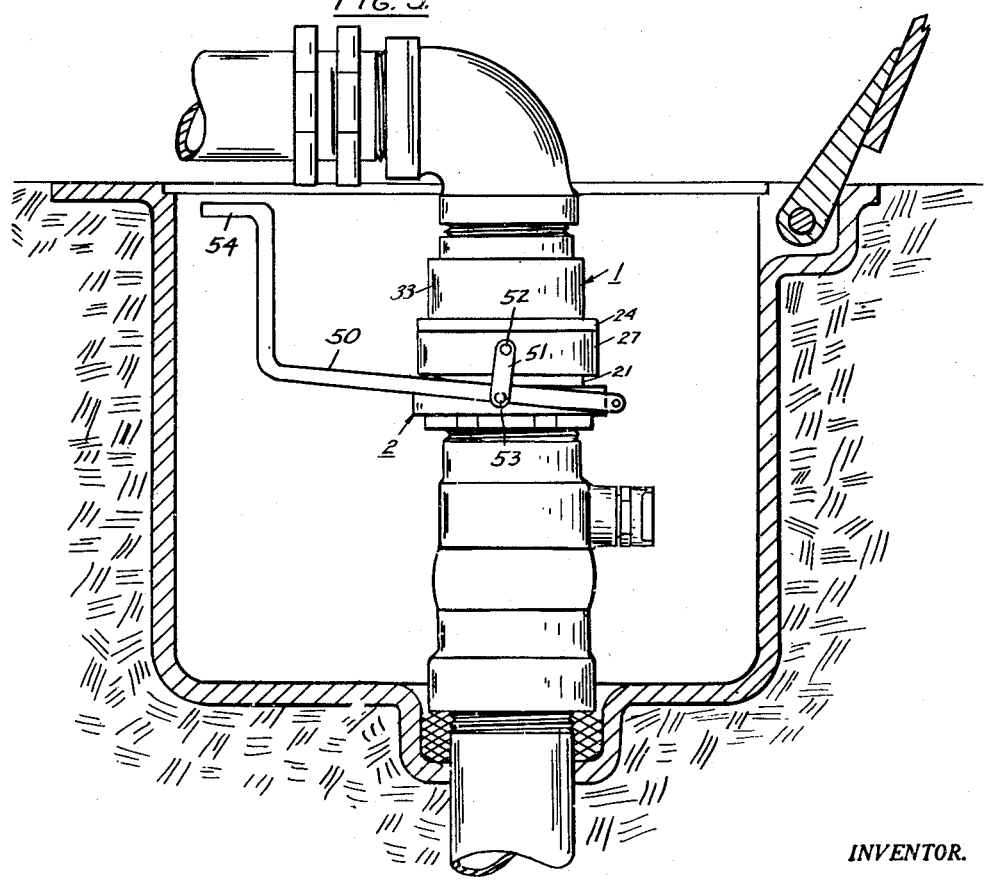
Fig. 6 is a side elevational view of my novel coupling member with an opening lever attached thereto.

Figs. 4, 5, and 6 show a lever 50 attached to shoulder 26 of the outer member 21. Links 51 are pivotably connected to the lever 50 and to the sleeve 27 by screw bolts 52 and 53, and a foot pedal 54 is provided on one end of the lever 50. To free the ball members 30, it is only necessary to step on the lever 54, thereby moving the locking sleeve 27 longitudinally to free the ball members 30 in the ball retaining aperture 25 to permit longitudinal movement of the female member 2, thereby sealing the male and female members 1 and 2.

It will be evident from the foregoing description that I have provided a novel coupling member, which is entirely sealed from the atmosphere at all times, which maintains the interior of the coupling free of deleterious matter, and which permits no loss of fluid upon the opening and closing of the coupling members.

Various changes may be made in the specific embodiment of my invention without departing from the spirit thereof or from the scope of the appended claims.

What I claim is:

1. A coupling comprising a female member having an outwardly extending sleeve, an apertured cylindrical member attached to and movable with said sleeve, a spring urged sleeve telescopically disposed on said cylindrical member adapted to cover the apertures therein and an outer member forming an annular groove and having ball retaining apertures, balls in said apertures and means for locking said balls; and a male member having an inner grooved shoulder and a connecting portion with a peripheral groove, said peripheral groove adapted to be engaged by the ball members in said female member for connecting said male and female members together and said grooved shoulder adapted to be sealingly engaged by the outwardly extending sleeve of said female member, a spring urged apertured cylindrical groove member adapted to sealingly engage the shoulder in said male member and adapted to be moved longitudinally by said fixed cylindrical member of said female member when said male and female member are connected together whereby fluid may flow through said male and female members.

2. A coupling comprising a male and female member, the female member having a cup-shaped extending portion with laterally extending apertures, an outwardly extending annular sleeve portion spaced from said cup-shaped member, and a spring urged movable sleeve adapted to cover said spertures in said cup-shaped member disposed between said outer sleeve and said cup-shaped member and said male member having an inner groove, a connecting portion, movable over the outer sleeve of said female member, and an inner grooved shoulder for sealingly engaging said annular sleeve portion of said female member, and a cup-shaped cylindrical member movable in said male member adapted to sealingly engage the shoulder therein and abut said cup-shaped member in said female member, and means for locking said male and female members together, said cup-shaped member in said female member adapted to move the said cup-shaped member in said female member longitudinally whereby fluid flows through said male and female members when they are connected together.

3. A coupling as set forth in claim 2 wherein said connecting portion of said male member has a peripheral groove and said female member has locking ball members for engagement with said groove and a camming member for locking said balls in engagement with the groove in the connecting portion of said male member.

4. A coupling comprising a female member having an inner closed cylindrical portion with laterally extending apertures, an outwarly extending sleeve portion spaced from said inner cylindrical portion, and an offset spring-urged sleeve adapted to cover the apertures in said cylindrical portion, a male member having an inner groove, and an outwardly extending connecting portion for disposal over and sealing engagement with the outer sleeve on said female member, and an inner shoulder adapted to be engaged by the offset sleeve of said female member to uncover the apertures in the cylindrical portions of said cylindrical member when said male and female members are connected together, and seal said outwardly extending sleeve portion of said female member, and a cup-shaped member having laterally extending apertures adapted to sealingly engage the shoulder in said male member and abuttingly engage the cylindrical portion of said female member; and means for locking said male and female members together.

5. A coupling as set forth in claim 4 wherein said connecting portion of said male member has a peripheral groove and said female member has a plurality of balls for engaging said groove and a camming member for locking said balls in engagement with the groove of said male member.

6. A coupling as set forth in claim 4 wherein the said male member has a peripheral groove and said female member has a plurality of balls, a camming sleeve for locking said balls in engagement with the groove of the connecting portion of said male member, and a lever for moving said camming sleeve out of locking engagement with said ball members.

7. A coupling as set forth in claim 4 wherein the outwardly extending sleeve portion of said female member is adapted to sealingly engage the inner shoulder of said male member.

ALBERT T. SCHEIWER.

(References on following page)

REFERENCES CITED

The following references are of record in the file of this patent:

UNITED STATES PATENTS

| Number | Name | Date |
|---|---|---|
| 809,746 | Rhoads | Jan. 9, 1906 |
| 1,465,648 | McNeill | Aug. 21, 1923 |
| 2,129,724 | Meyer | Sept. 13, 1938 |
| 2,135,222 | Scheiwer | Nov. 1, 1938 |
| 2,208,286 | Berger | July 16, 1940 |
| 2,254,997 | Fisher | Sept. 2, 1941 |
| 2,304,390 | Wolfram | Dec. 8, 1942 |
| 2,311,239 | Main | Feb. 16, 1943 |
| 2,319,015 | Speth | May 11, 1943 |